United States Patent
Picken

(10) Patent No.: US 10,889,657 B2
(45) Date of Patent: Jan. 12, 2021

(54) ALGINATE EXTRACTION METHOD

(71) Applicant: HaskoningDHV Nederland B.V., Amersfoort (NL)

(72) Inventor: Stephen James Picken, Delft (NL)

(73) Assignee: HASKONINGDHV NEDERLAND B.V., Amersfoort (NL)

( * ) Notice: Subject to any disclaimer, the term of this patent is extended or adjusted under 35 U.S.C. 154(b) by 74 days.

(21) Appl. No.: 16/085,880

(22) PCT Filed: Mar. 16, 2017

(86) PCT No.: PCT/NL2017/050164
§ 371 (c)(1),
(2) Date: Sep. 17, 2018

(87) PCT Pub. No.: WO2017/160148
PCT Pub. Date: Sep. 21, 2017

(65) Prior Publication Data
US 2019/0092878 A1 Mar. 28, 2019

(30) Foreign Application Priority Data
Mar. 16, 2016 (NL) ..................................... 2016441

(51) Int. Cl.
*C08B 37/00* (2006.01)

(52) U.S. Cl.
CPC ...... *C08B 37/0084* (2013.01); *C08B 37/0003* (2013.01)

(58) Field of Classification Search
None
See application file for complete search history.

(56) References Cited

U.S. PATENT DOCUMENTS

| 2,902,446 A | 9/1959 | Mitchell et al. |
| 2011/0168635 A1* | 7/2011 | Bender ................. A61L 24/001 210/663 |

FOREIGN PATENT DOCUMENTS

| WO | 02/29449 | 5/2000 | |
| WO | WO-2014113836 A1 * | 7/2014 | ............ A61K 36/02 |
| WO | 2015/190927 | 12/2015 | |
| WO | 2017/160148 | 9/2017 | |

OTHER PUBLICATIONS

Chejara, Dharmesh, et al., "Facile synthesis of new sodium alginate-anthracene based photosensitizers", Polymer Bulletin, vol. 72, No. 1, 2015, 35-48.

Hecht, Hadas, et al., "Structural Characterization of Sodium Alginate and Calcium Alginate", Biomacromolecules, vol. 17, 2016, 2160-2167.

Lin, Yuemei, et al., "Characterization of alginate-like exopolysaccharides isolated from aerobic granular sludge in pilot-plant", Water Research, vol. 44, No. 11, 2010, 3355-3364.

Sailaja, A. Krishna, et al., "Preparation of Alginate Nanoparticles by Desolvation Technique Using Acetone as Desolvating Agent", Asian Journal of Pharmaceutical and Clinical Research, vol. 5, No. 2, 2012, 132-134.

Vallee, Frederic, et al., "Synthesis and rheological properties of hydrogels based on amphiphilic alginate-amide derivatives", Carbohydrate Research, vol. 344, 2009, 223-228.

* cited by examiner

*Primary Examiner* — Layla D Berry
(74) *Attorney, Agent, or Firm* — Peacock Law P.C.; Janeen Vilven; Justin Muehlmeyer

(57) ABSTRACT

In a prior art reactor set up dense aggregates of microorganisms are formed, typically in or embedded in an extra cellular matrix. Such may relate to granules, to sphere like entities having a higher viscosity than water, globules, a biofilm, etc. The dense aggregates comprise extracellular polymeric substances, or biopolymers, in particular linear polysaccharides, The present invention is in the field of extraction a biopolymer from a granular sludge, a fibrous biopolymer obtained by said process, in particular alginate or bacterial alginate, and a use of said biopolymer.

14 Claims, 3 Drawing Sheets

ALGINATE EXTRACTION METHOD

FIELD OF THE INVENTION

Figure 1:
Figure 2A:
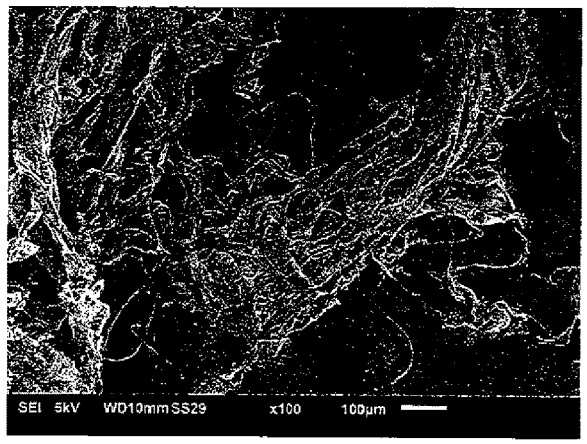
Figure 2B:
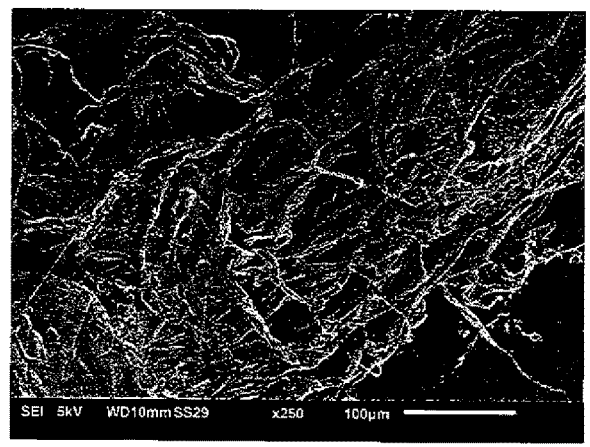
Figure 2C:
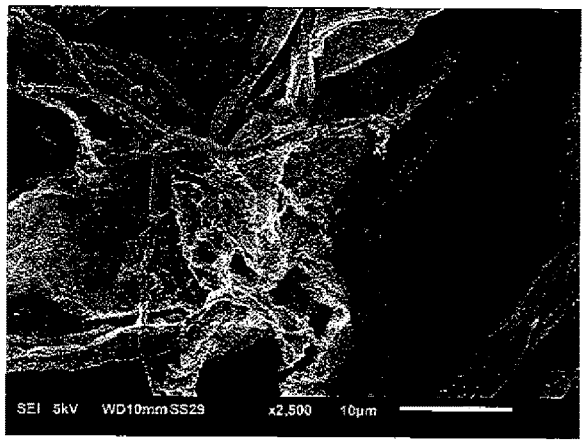
Figure 2D:

The present invention is in the field of extraction of a biopolymer from a granular sludge, a fibrous biopolymer obtained by said process, in particular alginate or bacterial alginate, and a use of said biopolymer.

BACKGROUND OF THE INVENTION

In a prior art reactor set up a (non-axenic) bacteria culture may be fed with a suitable carbon sources, in an aqueous environment. Therein dense aggregates of microorganisms are formed, typically in or embedded in an extracellular matrix. Such may relate to granules, to sphere like entities having a higher viscosity than water, globules, a biofilm, etc.

Some years ago the sludge produced from e.g. wastewater treatment processes, including granular sludge, was considered as a waste product, having no further use. On top of that, costs of waste disposal are high.

Recently it has been found that extracellular polymeric substances, in particular linear polysaccharides, obtainable from granular sludge can be produced in large quantities.

Granules making up granular sludge are (dense) aggregates of microbial cells self-immobilized through extracellular polymeric substances into a spherical form without any involvement of carrier material. A characterizing feature of granules of granular sludge is that they do not significantly coagulate during settling (i.e. in a reactor under reduced hydrodynamic shear). Extracellular polymeric substances make up a significant proportion of the total mass of the granules.

Extracellular polymeric substances comprise high-molecular weight compounds (typically >5 kDa, see also Li below) secreted by microorganisms into their environment. Extracellular polymeric substances are mostly composed of polysaccharides and proteins, and may include other macromolecules such as DNA, lipids and humic substances.

Advantageously, granules of granular sludge can be readily removed from a reactor by e.g. physical separation, settling, centrifugation, cyclonic separation, decantation, filtration, or sieving to provide extracellular polymeric substances in a small volume. Compared to separating material from a liquid phase of the reactor this means that neither huge volumes of organic nor other solvents (for extraction), nor large amounts of energy (to evaporate the liquid) are required for isolation of the extracellular polymeric substances.

Extracellular polymeric substances obtainable from granular sludge (preferably obtained from granular sludge) do not require further purification or treatment to be used for some applications, hence can be applied directly. When the extracellular polymeric substances are obtained from granular sludge the extracellular polymeric substances are preferably isolated from bacteria (cells) and/or other non-extracellular polymeric substances.

However, for various applications the extracellular polymeric substances, in this document also referred to as "biopolymers", can not be used directly, e.g. in view of insufficient purity, a typical (brownish) coloring of the extracellular polymeric substances, etc. In this respect it is noted that the present invention is in principle equally suited for biopolymers in general.

With the term "microbial process" here a microbiological conversion is meant.

Some documents recite isolation of alginate from aerobic granular sludge.

Li et al. in "Characterization of alginate-like exopolysaccharides isolated from aerobic granular sludge in pilot plant", Water Research, Elsevier, Amsterdam, NL, Vol. 44, No. 11 (Jun. 1, 2010), pp. 3355-3364) recites specific alginates in relatively raw form. These alginates are typically not suited for further use as these are at least partially colored. In the process active carbon may be used, but that is mainly for removing impurities from the solution. Also the lipid content of the alginates is rather low (<1 wt. %).

In WO2015/190927 A1 an extraction method of biopolymers is recited for extracting biopolymers from dense aggregates formed by microbial organisms. The method specifically relates to extracting an anionic biopolymer. In a step of the method the pH is increased by addition of at least 1-20% v/v of at least one of $Cl_2$, $OCl^-$ and $H_2O_2$. The addition of the $Cl_2$, $OCl^-$ or $H_2O_2$ is found to cause discoloration of the biopolymer. In terms of efficiency this method is capable of extracting only 20% of the biopolymers being available in the aggregates being available in an aqueous solution. Also the quality of an end-product (biopolymer) is not very good, as sticky and sometimes hydrophilic products are formed; as a result thereof a further use, without an extra process step for improvement, is limited.

Incidentally some documents recite alginate suspensions and the like.

U.S. Pat. No. 2,902,446 A1 recites methods of preparing suspensions of (sodium) alginate in concentrated preparations for the production of foams for fire extinguishing, though the document is not directly clear on amounts used.

Vallee et al. in "Synthesis and rheological properties of hydrogels based on amphiphilic alginate-amide derivatives.", Carbohydr. Res. 2009 Jan. 26; 344(2):223-8, recite amphiphilic derivatives of sodium alginate were prepared by covalent attachment of dodecylamine onto the polysaccharide via amide linkages at different substitution ratios, using 2-chloro-1-methylpyridinium iodide (CMPI) as coupling reagent for activation of the carboxylate groups of the alginate. Dodecylamine is considered to have a low reactivity, hence the need for CMPI, as well as poor solubility, hence DMF. Alginate was dissolved in DMF. The method of Vallee is considered complex and not environmentally friendly. It is performed under cooling to 0° C.

Chejara et al. in "Facile synthesis of new sodium alginate-anthracene based photosensitizers", in Polymer Bulletin, Vol. 72, No. 1, p. 35-48, obtain water-soluble sodium alginate (Na-Alg) derivatives employing anthracene moieties (Anth). Na-Alg amide (Alg-Anth amide), and Na-alg ester (Alg-Anth ester) derivatives were synthesized using 2-amino anthracene and 9-chloromethyl anthracene (9-CMA), respectively; hence always comprising anthracene. It is not clear of water is separated during said synthesis. The synthesis is carried out at room temperature (~25° C.).

Sailaja et. al in "Preparation of sodium alginate nanoparticles by desolvation technique using iso propyl alcohol as desolvating agent", Asian J. Pharmaceutical and Clinical Research, 2012, Vol. 5, No. 2, p. 132-134, amongst others by continuous addition of an otherwise unknown (relative) amount of acetone at a pH of 4, in order to load a medicament, such as Ibuprofen. As mentioned only nanoparticles are formed.

WO 00/29449 A recites Biopolymer salts with low endotoxin levels, Biopolymer compositions thereof and methods of making the same, having an endotoxin content less than about 100 endotoxin units per gram. Because of their low endotoxin content, the biopolymer salts and biopolymer compositions of this invention may be administered parenterally to a patient. In an example such a precipitation of commercially available biopolymer (alginate), with high endotoxin levels, with methanol is shown, using ⅔ methanol and ⅓ alginate solution, aimed at reducing the endotoxin level. The obtained product was dried and milled. A further example shows a use of acetone instead of methanol, but the example is silent of the characteristics of the product formed. It is further not clear what the efficiency of the method is.

The present invention relates to a method of extraction of a biopolymer from a granular sludge, a biopolymer obtained by said process, and a use of said biopolymer, which overcomes one or more of the above disadvantages, without jeopardizing functionality and advantages.

SUMMARY OF THE INVENTION

The present invention relates in a first aspect to a process according to claim 1. There with a simple and effective process is presented for extracting biopolymers from e.g. dense aggregates formed by microbial organisms, and specifically alginates. The process specifically relates to extracting an ionic biopolymer, such as an anionic biopolymer, and specifically mono-valent alginate (alg) or bacterial alginate (ALE) from an aqueous solution. In a step an aqueous mono-valent anionic biopolymer such as alginate or bacterial alginate (ALE) solution is provided, wherein the alginate is present in an amount of 0.1-30 wt. %. Thereafter 35-60 vol. % (or vol. %) non-solvent, such as acetone (dimethyl ketone), is added under mixing, such as by stirring or shaking, to the solution; steps (ii) and (iv) of claim 1 may be interchanged. The acetone may typically have a water content of 5-25% v/v. It is preferred to use relatively dry acetone having a water content as low as possible, e.g. 1-5% v/v water/acetone mixture, and likewise for other non-solvents. The mixing is preferably a vigorous mixing, e.g. using an impellor at relatively high speeds (600-1000 rpm). Surprisingly thereafter the biopolymer can be extracted from the solution with a relatively high yield. Throughout the description weight percentages are relative to a total mass of the solution, unless indicated otherwise; likewise volume percentages are calculated. The steps may be performed at an elevated temperature (e.g. 310-375 K), or at an (close to) environmental temperature (e.g. 280-300 K). The present process is typically carried out in a reactor.

A step in the extraction process is treatment of the alginate solution to be able to extract the polymer as a solid material. It is found that of a range of possible extraction solvents acetone (dimethylketone) is by far the best in terms of subsequent sample removal via filtering and solvent evaporation to obtain a monovalent (e.g. sodium) salt of the extracted polymer and is very effective/efficient; other suitable non-solvents are mono- or dialkyl ketones, such as methyl ethyl ketone, and alkoxy alkanols, such as iso propoxy ethanol, giving similar results as acetone. In an example the addition of about 50% acetone to a 3% sodium alginate solution in water yields about 80% extraction efficiency via filtration of the formed fibrous mass of precipitated Na-alg/Na-ALE. The precipitate is not sticky/gel like contrary to the more commonly used precipitation with ethanol (known from current alginate extraction processes applied to seaweed harvesting and by analogy is intended to be used for Nereda® sludge). No doubt other (non)solvents could in principle be used, but surprisingly the results thereof were found to be relatively poor: ethanol forms a sticky precipitate, which is difficult to work up; ether, such as diethyl ether, does not form a precipitate, and it does not mix with water; butanol forms a two phase system, with a gel like consistency; DMSO (dimethyl sulfoxide) lets alginate precipitates, but it forms a sticky gel, and DMSO is not volatile hence can not be separated easily from the alginate; ethylene glycol shows no precipitation and forms a homogenous gel; and methanol shows a similar behaviour to ethanol, and is in fact even more sticky. The acetone extraction also works extremely well for other monovalent anionic biopolymers such as ammonium alginate solutions and for drying of gel-like acid ALE. Acetone is considered to be a rather optimal treatment method as it is easy to work-up again via distillation/membrane separation and analogous methods; also it is a naturally occurring compound so it does not provide any major issue if trace amounts remain in the product. Part of the acetone recovery can be combined with the drying of the biopolymer precipitate, which may involve heat such as with distillation. Other processes are available to get rid of the remaining acetone/water supernatant.

The obtained biopolymers resemble those of the prior art, but are different in certain aspects, such as characterized in the claims; i.e. compared to e.g. algae alginate chemical and physical characteristics are found to be different, such as a lipid content is much higher (2-5 wt. %) and the polymers have a fibrous structure comparable to cotton wool. Typical fibres obtained are a few (1-2) mm to a few (1-5) cm long having a thickness of 2-250 μm (such as 10-100 μm) and fibres may have a yellowish appearance. The different characteristics result in different applications of the present biopolymers now being possible, or likewise being impossible, compared to those of the prior art.

It is noted that numbering of the various steps are given for a better understanding of an optional sequence of the steps. Some of the steps may be performed in a different sequence, and/or at a later or earlier stage.

Thereby the present invention provides a solution to one or more of the above mentioned problems.

Advantages of the present invention are detailed throughout the description.

DETAILED DESCRIPTION OF THE INVENTION

The present invention relates in a first aspect to a process according to claim 1.

The present process may be further optimized by in an initial stage removing larger particles, such as by sieving. Preferably particles with a diameter larger than 500 μm are removed, more preferably particles larger than 300 μm, such as larger than 200 μm. Therewith it has been found that the present process is more effective, less energy consuming, and an even higher yield of biopolymer is obtained.

The present process may be further optimized by removing part of the water being present, thereby increasing an amount of aggregates. In an example, after providing the sludge, water is removed to a 1-40% w/v content of the wet sludge, more preferably 5-38% w/v, even more preferably 10-35% w/v, even more preferably 20-32% w/v, such as 25-30% w/v. For better understanding also a solid contents fraction may be used. The present process is found to be more effective if part of the water is removed in an initial stage.

In an example the present process comprises the step of (i) extracting the mono-valent biopolymer such as alginate or bacterial alginate (ALE) from an aqueous solution with e.g.

extracellular polymeric substances obtainable from granular sludge. In the latter case the alginate is obtained from granular sludge in a mono-valent form. Suitable cations are $K^+$, $Na^+$, and $NH_4^+$, preferably $NH_4^+$. One might consider $K^+$ and $NH_4^+$ to be of a similar physical and chemical nature, e.g. in terms of radius, valence, solubility of salts containing said cation, etc. It is therefore unexpected that $NH_4^+$ performs much better in terms of extraction efficiency of the biopolymer from the aqueous solution, i.e. about 20% for $K^+$ versus up to 40% for $NH_4^+$, i.e. about twice as much.

In an example of the present process the biopolymer is bacterial aerobic granular sludge or anammox granular sludge, and is selected form exopolysaccharide, preferably comprising mannuronic acid and guluronic acid residues, block-copolymers comprising uronic acid residues, alginate, lipids, and combinations thereof, or wherein the biopolymer is an algae biopolymer. In an example, the exopolysaccharides are block-copolymers comprising uronic acid (e.g. mannuronic acid and guluronic acid) residues. Especially bacterial aerobic granular sludge or anammox granular sludge has been found to produce high amounts of biopolymers, in good quality. By nature the biopolymers produced as such vary in their characteristics, e.g. composition, molecular weight, etc.

Aerobic granular sludge and anammox granular sludge, and the processes used for obtaining them are known to a person skilled in the art. For the uninitiated, reference is made to *Water Research,* 2007, doi:10.1016/j.watres.2007.03.044 (anammox granular sludge) and *Water Science and Technology,* 2007, 55 (8-9), 75-81 (aerobic granular sludge).

In an example of the present process the granular sludge has been substantially produced by bacteria belonging to the order Pseudomonadaceae, such as *pseudomonas* and/or *Acetobacter* bacteria (aerobic granular sludge); or, by bacteria belonging to the order Planctomycetales (anammox granular sludge), such as *Brocadia anammoxidans, Kuenenia stuttgartiensis* or *Brocadia fulgida*; or, combinations thereof.

In an example of the present process the extracellular polymeric substances are in aqueous solution at a concentration in the range of 0.1-30% w/w, preferably 1-10% w/w, most preferably 4-10% w/w, such as 5-8% w/w.

In an example of the present process the extracellular polymeric substances comprise a major portion consisting exopolysaccharides, and a minor portion, such as less than 30% w/w, typically less than 10% w/w, consisting of lipids and/or other components more hydrophobic than the exopolysaccharides. Extracellular polymeric substances obtained from granular sludge having a major portion of exopolysaccharides and a minor portion of lipids have been found to provide very effective water resistance.

In an example of the present process the extracellular polymeric substances comprise at least 50% w/w exopolysaccharides, preferably at least 60% w/w exopolysaccharides, most preferably at least 75% w/w exopolysaccharides, such as at least 90% w/w exopolysaccharides, more preferably wherein an exopolysaccharide content is less than 100% and the isolated extracellular polymeric substances further may comprise 0.1-10 w/w % lipids, such as 0.2-5 w/w %. The exopolysaccharide content is preferably not 100%, as a remainder has been found to contribute to the present advantageous effects.

In an example the present process comprises the step of, directly before adding a non-solvent as acetone, (iii) dissolving alginate under addition of 1-5 wt. % of a monovalent salt of at least one of carbonate, hydroxide, hypochlorite, peroxide, such as hydrogen peroxide, such as $Na^+$, $K^+$, and $NH_4^+$— salts, e.g. $(NH_4)_2CO_3$, and ammonia, preferably ammonia.

In an example of the present process the amount of non-solvent, such as acetone, is 40-55 vol. %. The amount of acetone is determined taking in mind any water typically being present in the acetone. It has been found that too much acetone does not improve the process, and too low amounts of acetone do not yield biopolymer. Optimal results have been found in the ranges given.

In an example of the present process extraction is performed by filtering.

In an example the present process comprises (vi) a work up step for retrieving acetone, such as by distillation, decantation, membrane separation, or evaporation.

In an example the present process comprises (vii) a step of redispersing biopolymer, such as alginate, by wetting with 0.1-10 vol. % acetone. Unexpectedly the present biopolymer such as alginate can be wetted very well and thereafter redispersed or redissolved. In the prior art redispering or redissolving alginates is found to be cumbersome.

In an example the present process comprises (viii) a step of sedimentation. Therewith polymer obtained by the present process can be removed easily.

In an example the present process comprises a step of (ix) heating the alginate to a temperature above 340 K, preferably above 350 K, such as above 360 K, during a period sufficient to irreversibly transfer the alginate into alginate-amide under separation of water (condensation), wherein the alginate is ammonium-alginate. Surprisingly a fully biobased thermoset resin can be formed as a result. It has been found that a period of 1-10 minutes is typically sufficient, at a temperature of 365 K.

In an example of the present process comprises the step of removing the sludge by one or more of physical separation, settling, centrifugation, cyclonic separation, decantation, filtration, sieving, and flotation, under suitable conditions. Especially good results have been obtained by centrifuging the sludge.

In an example of the present process a suspension of the sludge is centrifuged, such as at 2000-6000 rpm, during 10-45 minutes, and a supernatant is collected for further processing.

In an example of the present process after step an acidic gel is centrifuged, such as at 2000-6000 rpm, during 10-45 minutes, and a supernatant is collected for further processing.

In an example of the present process the extracted biopolymer is further treated, such as by precipitation, such as by addition of an alcohol, by desalination, by osmosis, by reverse osmosis, by salt-formation, such as Na-salt, by neutralising, by adding a base, by drying, by storing, and by freezing. Therewith a product is obtained that can be used in a further application, that can be sold, and that can be stored.

In a second aspect the present invention relates to fibrous polymer, such as alginate or ALE, obtainable by the present process. It has been found that the alginate has different characteristics from prior art alginates, such as being fibrous, as is further detailed throughout the description. It is noted that the present alginate typically comprises trace amounts of non-solvent such as 0.0001-0.1 wt. % acetone.

In an example of the present fibres as monovalent cation $NH_4^+$ is present.

The present biopolymers may be characterized by various (further) parameters. They may be different in various aspects from e.g. known comparable chemically or otherwise obtainable polymers, such is in viscosity behaviour, molecular weight, hydrophobicity, lipid content, microstructure (as can be observed under an electron microscope), etc. For instance, the lipid content of the present biopolymers is much higher than those of prior art comparable biopolymers, namely 2-5 wt. %, such as 3-4 wt. %. Analysis of an exemplary biopolymer using a PerkinElmer 983 double beam dispersive IR spectrometer shows approximately 3.2 wt. % peaks that are attributed to lipids. Typically the present biopolymers are also less pure, i.e. a mixture of polymers is obtained.

The present biopolymer may relate to an alginate, such as ALE. This is different from the alginates e.g. obtainable by the above pilot plant alginates in various aspects. For instance it may have a decreasing dynamic viscosity with increasing shear rate (@ 25° C.), wherein a relative decrease is from 5-50% reduction in dynamic viscosity per 10-fold increase in shear rate. It may have a dynamic viscosity of >0.2-1 Pa*s (@ 25° C., @ shear rate of 1/sec). It may have a number averaged weight of >10,000 Dalton, preferably >50,000 Da, such as >100,000 Da. It may have a hydrophilic part and hydrophobic part. It may have a tensile strength (according to ISO 37; DIN 53504) of 1-150 MPa. It may have a flexural strength (according to ISO 178) of 5-250 MPa. And it may relate to combinations of the above.

In an example of the present biopolymer it may have >30% with a molecular weight of >300,000 Da, >10% with a molecular weight of >100,000 Da, >15% with a molecular weight of >5,000 Da, and <10% with a molecular weight of <5,000 Da.

In a third aspect the present invention relates to a use of 0.1-10 wt. % biopolymer, such as alginate or ALE, in a solution, preferably the present alginate or ALE, preferably in an aqueous solution, for fire extinguishing, optionally comprising 0.1-10 wt. % clay mineral. It has been found that fires are extinguished more efficiently, using less water, and the alginate and optional clay are considered to form a coating, which coating does not set fire. It is preferred to use 0.2-5 wt. % alginate, such as 1-2.5 wt. %. It is preferred to use 0.2-5 wt. % clay mineral, such as 1-2.5 wt. %. In an example the present clay minerals are one or more of a natural or artificial clay, the clay preferably being a monovalent cation clay. The clay preferably has a cationic exchange capacity of 2-200 meq/100 grams clay at a pH of 7, more preferably 5-150 meq/100 grams, even more preferably 10-120 meq/100 grams. It has been found that clays having a relatively higher CEC perform better in terms of relevant characteristics for the present invention. The clay may comprise one or more of H+, Na+, K+, Li+. The clay may be a tetrahedral-octahedral-tetrahedral (TOT)-clay (or 2:1 clay), such as a kaolin clay, such as kaolinite, dickite, halloysite and nacrite, a smectite clay, such as bentonite, montmorillonite, nontronite and saponite, an illite clay, a chlorite clay. Also a silicate mineral, such as mica, such as biotite, lepidolite, muscovite, phlogopite, zinnwaldite, clintonite, and allophane, are applicable as well as platelet like particles.

In a fourth aspect the present invention relates to a use of 0.1-10 wt. % alginate amide in an adhesive, in a thermoplastic, as an additive in concrete, or in a coating.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

FIGURES

FIG. 1 is a photo of fibrous alginate obtained by the present process.

FIGS. 2a-d show SEM-photos of the present alginate.

Figure 3:
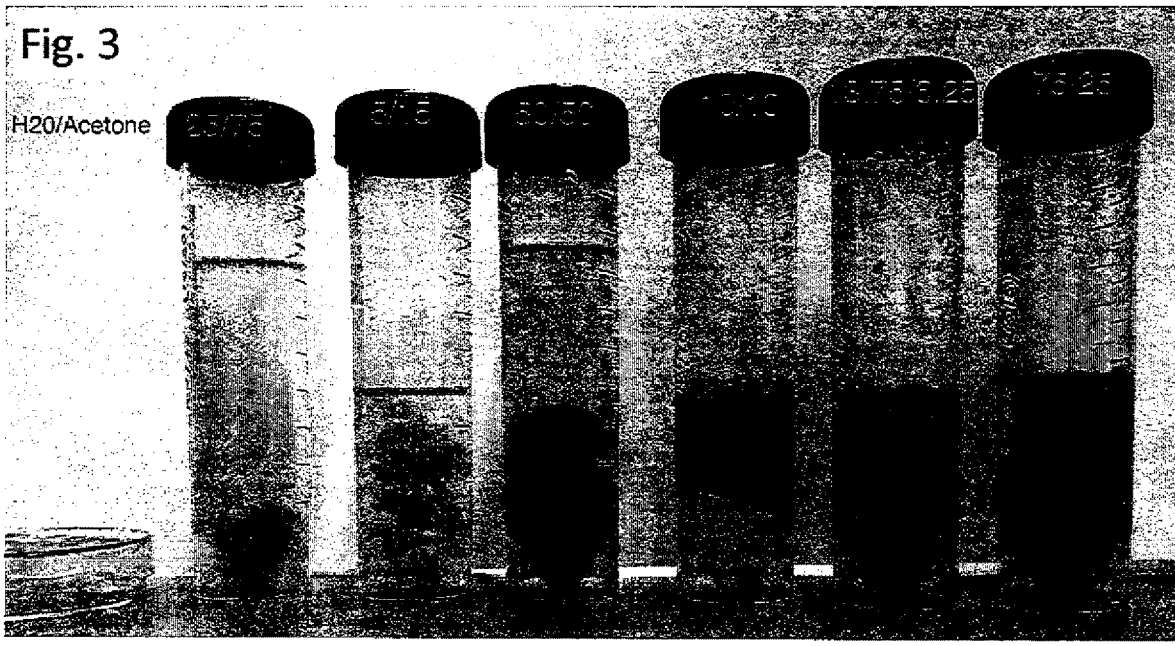

FIG. 3 shows results of variation in amount of acetone.

Figure 4:
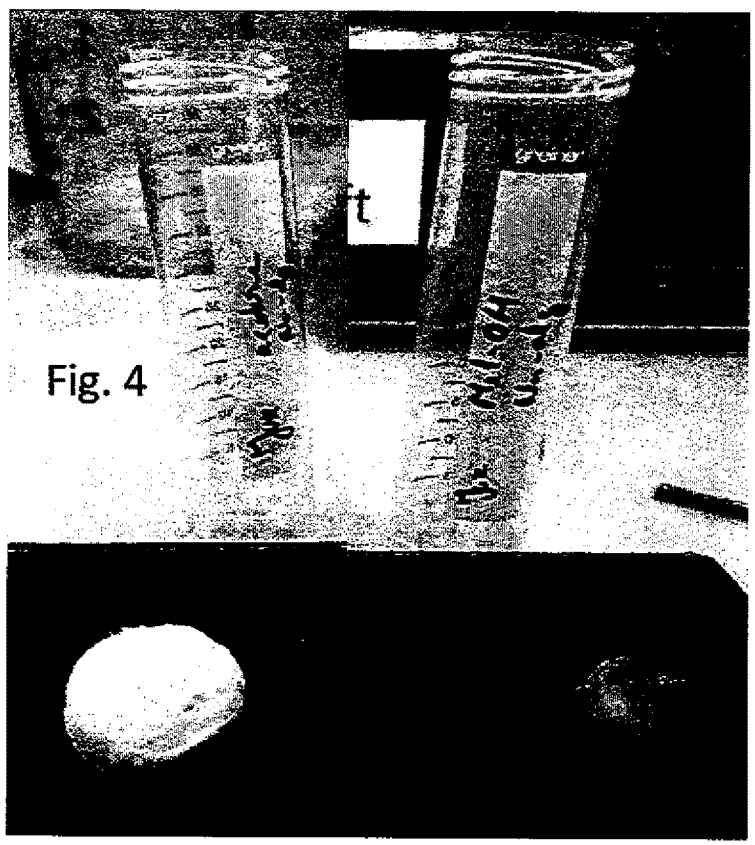

FIG. 4. Photo of macroscopic samples from left to right: acetone, methanol.

Figure 5:
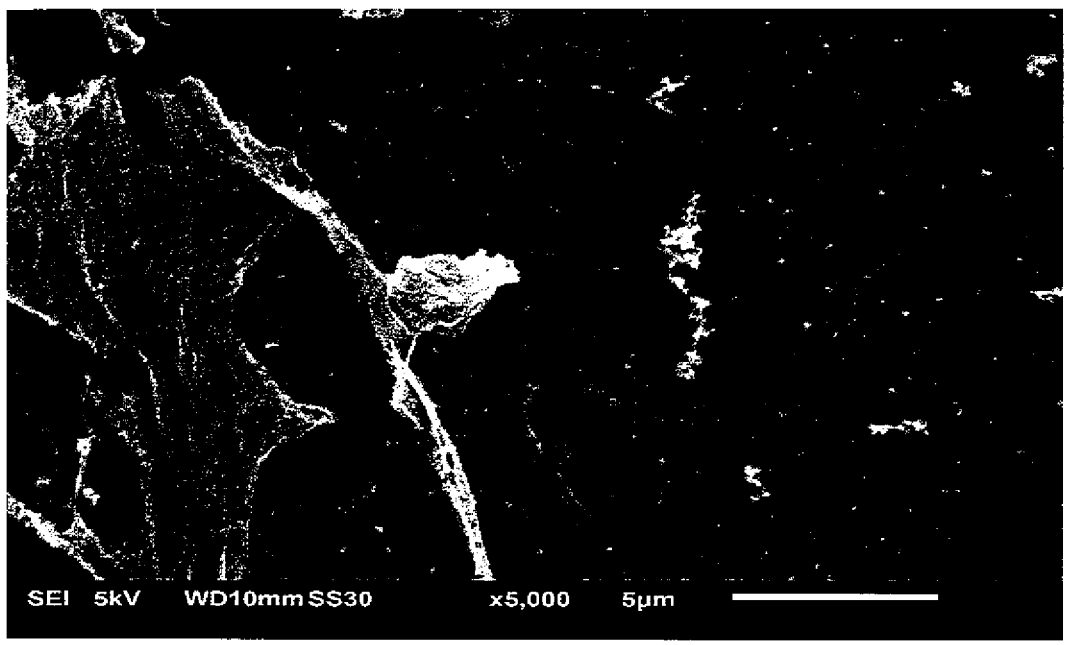

FIG. 5. SEM image of fibrillar Na-Alginate precipitated with acetone.

Figure 6:
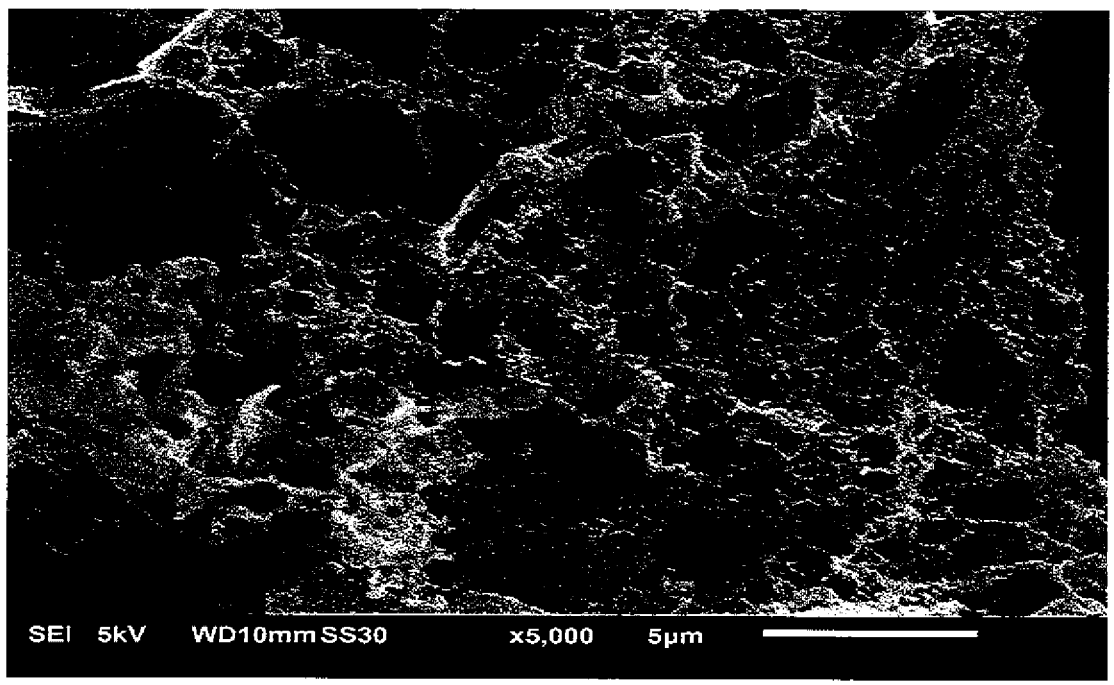

FIG. 6. SEM image of Na-Alginate precipitated with methanol. No clear fibrillar structure is observed, rather a dense film. (this is also visible from FIG. 4).

DETAILED DESCRIPTION OF THE FIGURES

FIG. 1 shows a cotton-ball like example of the present fibrous alginate after freeze drying. The length is a few centimeters. First (i) a 3% Na-alginate solution in $H_2O$ was prepared, (ii) the solution was left to homogenise and some occasional stirring was applied, (iii) thereafter about 50% acetone to the alginate/$H_2O$ solution was added, decant on top and shaken vigorously, (iv) then the supernatant was poured off and replace with 100% acetone. This was repeated several times. A fibrillar mass of Na-alginate in acetone with a low water content was obtained. Then (v) the moistened fibrillar mass was placed in a freezer and then the solvent was evaporated off in vacuum; thereby a freeze dried Na-alginate fibrillar mass was obtained. The freeze drying procedure is found to prevent the sample from collapsing so the morphology can be investigated more easily. Overall sample size is about 4 cm long, 1 cm diameter.

FIG. 2a-d show SEM photos of the present Na-alginate. Typical fibres obtained are a few (1-2) mm to a few (1-5) cm long having a thickness of 2-250 μm. Small fragments were imaged using a SEM (see scale bars for magnification and SEM settings). Various techniques were used, such as sputtered with Au to prevent charging, and also a backscatter image.

EXAMPLES/EXPERIMENTS

The invention although described in detailed explanatory context may be best understood in conjunction with the accompanying examples and figures.

Inventors found that solutions of $NH_4$-alginate precipitate quantitatively and very efficiently by adding in an example about 50 vol. % acetone. Other (non)solvents work reasonably well, such as ethanol, but acetone has a more dramatic effect. This indicates that a commercial grade ALE alginate can be made from granular sludge via dissolution with a base (e.g. NaOH, $NH_4OH$, KOH etc.) yielding an ammonium ALE or equivalent. This can be easily cleaned from residues via straightforward filtration & sedimentation (especially ammonium is considered optimal). Adding about 50% acetone under stirring is found to cause a fluffy precipitate of ammonium-alg to form, which can be pressed and dried on filter paper, and left to rest for further desiccation. An alternative procedure may be considered using a shower head, capillary nozzle, spinneret etc. to disperse the alginate solution into acetone as the coagulation bath. By this process it is very easy and cost effective to precipitate and dry large volumes of alginate, at least on a lab scale. Other precipitation inducing non-solvents than acetone no doubt exist, also mixing ratios no doubt can be optimized.

An exemplary procedure is to take 5 kg granular sludge, add water and technical grade NaOH or ammonia to a total volume of 15 l, dissolve the sodium or ammonium ALE and precipitate/filter out unwanted residue, the filtrate (supernatant) can be precipitated by adding about the same volume of acetone. Press, dry, and powder yields about 1 kg of dry ALE powder.

Detailed Example

The extraction of $NH_4$-alginate with acetone and ethanol was performed over the period Q4 of 2015. Stock solution contained 0.11081 gr alginate/3.219 gr solution or 0.0344 gr/ml. Inventors precipitated 10 ml of such solutions with about the same amount of ethanol and acetone, the amount of alginate in the system is 10×0.0344=0.344 gram. Acetone extraction yielded 0.22560 grams or 66%, and ethanol extraction 0.06346 gram or 6% which is considered to be a dramatic difference.

Acetone Extraction Examples

In the experiment below a solution comprising 3.4447 wt. % Na-alg was formed. The amount of acetone seems to require a critical amount, about 20/80 acetone/water ratio or higher is needed to form a precipitate. The precipitate becomes easy to remove above a 40/60 acetone/water ratio. The following table gives some idea of the tested mixing ratios and extracted percentages:

TABLE 1 results of alginate extraction using acetone

| Na-alg in H2O/ml | acetone/ml | acetone % | Na-alg mass expected | Na-alg mass extracted | ratio | comments |
|---|---|---|---|---|---|---|
| 5 | 15 | 0.75 | 0.172235 | 0.18519 | 1.075217 | seems too much |
| 10 | 10 | 0.5 | 0.34447 | 0.28958 | 0.840654 | |
| 12.5 | 7.5 | 0.375 | 0.4305875 | 0.31556 | 0.732859 | |
| 13.75 | 6.25 | 0.3125 | 0.47364625 | 0.2423 | 0.511563 | OK thin film |
| 15 | 5 | 0.25 | 0.516705 | 0 | 0 | no precipitate |

In this experiment a minimum amount of acetone was found to be about 30/70 acetone/water ratio. At higher percentages of acetone the yield increases. In addition above a ratio of 50/50 acetone/water the improvement in yield dropped in relative terms, and above 60/40 acetone/water not much improvement was obtained. At a ratio of 75/25 all (see 107% above) of the alginate was precipitated; the 7% extra indicates an uncertainty in the experimental results, so possibly some more alginate was present in the initial solution, some impurities in the final product were present, etc.

FIG. 3 represent results of the above experiments. From left to right (25/75), which is the same as the next (5/15), then (50/50) which is the same as the next (10/10), then the (13.75/6.25), and finally the (75/25) which is the same as (15/5) above. In summary at low relative amounts of acetone no fibers are formed, though possibly nano-particles may be present. At above about 60% acetone no significant improvement of efficiency was found.

Dispersing Obtained Alginate

An additional advantage of the present alginate involves acetone being suitability as a dispersant. The dissolution of e.g. prior art Na-alginate in water starting from the powder is found inconvenient due to the tendency for the powder to stick together (there are gel like 'lumps' in the sauce). This can be very effectively eliminated by first moisturizing the Na-alginate powder with acetone. This Na-alg/acetone damp powder can be freely dispersed in water by manual stirring. Only after some time does the Na-alginate powder start to swell and dissolve while avoiding the formation of any 'lumps' in the sauce.

Below exemplary embodiments of a process of extraction of a specific biopolymer (microbial alginate; ALE) is given. Note that various steps are optional.

Extraction of ALE from Granular Sludge

1) Sieve the granular sludge to collect granules diameter more than 200 μm, then wash with tap water.
2) Remove the excess water using tissue paper placed under the sieve.
3) Before starting the extraction, take ±1 gram of sludge for dry weight determination. Measure the empty cup, the filled cup and put in the oven (105° C.) to dry. Weigh again if dried.
4) Prepare granules suspension in tap water with a Total Solids TSS content of about 5%. This corresponds with 50-55 gram wet weight sludge in a total volume of 100 mL.
5) The ALE was extracted by addition of ammonium hydroxide with final pH at 10.5 for 2 days at 20° C. without any agitation.
6) The supernatant was separated by decantation and 30-70 v/v % acetone was added to the solution.
7) The ammonium ALE is precipitated out of the solution as a fibrous mass when the acetone is added.
8) Following the precipitation of the ammonium ALE further separation can be accomplished by centrifugation, flotation or any similar separation methods.
9) The ammonium ALE can be stored at 4° c. or frozen.

ALE Molecular Weight Analysis

Size exclusion chromatography was performed with a Superdex 75 10/300 GL column (AKTA Purifier System, GE Healthcare). Elution was carried out at room temperature using Phosphate Buffer Saline (PBS) containing 10 mM ($HPO_4^{2-}$, $H_2PO_4^-$) with a pH of 7.4, and further having 2.7 mM KCl and 137 mM NaCl, at a constant 0.4 mL/min flow rate. The detection was monitored by following the absorbance of the eluted molecules at a wavelength of 210 nm.

The Superdex 75 10/300 GL column is capable of separating molecules of 1,000 to 70,000 Daltons (Da). Measurement of the elution volume of dextran standards (i.e. 1000 Da, 5000 Da, 12000 Da, 25000 Da and 50000 Da) led to the calibration equation:

$$Log(MW) = 6.212 - 0.1861\, Ve;$$

Wherein MW: Molecular Weight of the molecule in Dalton (Da), and Ve: elution volume in mL (assayed at the top of the peak). Chromatogram profiles were recorded with UNICORN 5.1 software (GE Healthcare). Peak retention times and peak areas were directly calculated and delivered by the program.

Results

TABLE 2

Molecular weight of different fractions in alginate-like exopolysaccharides and their percentage.

| Elution volume of the peak (ml) | Molecular weight (kDa) | Percentage of the fraction (% peak area) |
|---|---|---|
| 7.83 | >70 | 29.74 |
| 13.48 | 14.4 | 18.82 |
| 15.57 | 5.79 | 45.15 |
| 17.58 | 2.15 | 4.42 |
| 20.13 | 0.656 | 1.87 |

Rheology Experiments

Viscosity is considered to be an important parameter for biopolymers, such as alginate. Rheology studies the phenomena that appear during deformation and flow of fluids, solids and of solid systems under the influence of external forces. Newton's law is considered to apply for fluids such as to ideal elastic and viscous materials.

Rheological experiments are performed to determine the viscosity versus the shear rate, the critical overlap concentration, the thermal stability and the salinity stability. The viscosity is measured as a function of shear rate using an AR-G2 Rheometer.

Materials and Method

The rheology experiments are performed in an AR-G2 Rheometer using Couette Geometry. The Rheometer is filled with 20 ml samples of the polymer solution Na-ALE in the desired concentrations and salinity's. The alginic acid is converted to the desired polymer solution (sodium alginate (Na-ALE)) by adding NaOH and deionized water.

To prepare the polymer solution samples for the rheology experiments a stock solution of the highest concentration is prepared first. Thereafter the highest concentration stock solution is diluted to the desired (lower) concentrations. The stock solution is prepared as follows:

The amount of alginic acid required is weighted with a mass balance.

Subsequently NaOH (0.1 N) is added gently to the solution to avoid particle agglomeration.

The solution is stirred and the pH is measured continuously.

NaOH (0.1 N) is added up to a final pH of approximately 8.3 and the solution is supplemented to the required volume with deionized water.

The beaker is stirred for 30 minutes at high speed and covered with aluminum foil to prevent contact with air.

Subsequently, the stirrer is reduced to medium speed and the solution is stirred and degassed for at least one day to create a homogeneous polymer solution in equilibrium and to guarantee hydration.

Finally the stock solution is diluted with deionized water to 20 ml of polymer solution to the desired concentrations.

Results

The viscosity of ALE and alginate solutions at various shear rates is shown in FIG. (1a-c). The viscosity (vertical axis, Pa*s) of ALE decreases as the shear rate increased (horizontal axis, 1/s). This is shown for four different solutions, from top to bottom, having 5%, 3%, 2%, and 1% alginate, respectively. Apparently the present solutions, comprising the present ALE, show non-Newtonian behavior in this respect.

In comparison, in FIG. 1b the viscosity of algae alginate is affected less by changing shear rate. This is shown for five different solutions, from top to bottom, having 10%, 5%, 3%, 2%, and 1% algae alginate, respectively.

Such is considered an indication that the solution of ALE is more pseudoplastic than that of comparable algae alginates. This property may provide advantages in processing, such as pumping and filling.

Comparative Examples

In order to clarify differences between the biopolymer obtained with the present method and those obtained with prior art methods comparative experiments have been performed. Three samples were prepared using 3 wt. % initial Na-Alginate solution. Following that a 33:66 ratio of Na-Alg solution:solvent (methanol, acetone, and ethanol, respectively) was made. Then the solvent was mixed with the Na-Alginate solution, which was followed by vigorous shaking for 20 seconds. The ethanol and acetone samples were effectively separated, while the methanol system was more slurry (FIG. 4).

All of the samples were freezed at −80° C., followed by freeze drying to completely remove water and solvent. Analysis of the morphology was performed using a scanning electron microscope, where a very fine fibrillar structure for Na-Alginate precipitated by acetone was observed, more coarse structures for the with ethanol precipitated sample, and no fibres for the methanol sample (FIG. 5-6).

In conclusion a precipitation with methanol does not result in fibrous alginate; precipitation with ethanol shows some coarse structures, whereas the best results in this respect are obtained with acetone providing fluffy structures. It is noted that both the methanol and ethanol precipitation give much lower yields and in addition the products obtained have further disadvantages in comparison with the acetone product, such as being sticky.

The invention claimed is:

1. A process for biopolymer extraction for obtaining fibrous biopolymer comprising the steps of
   (ii) providing an ionic biopolymer aqueous solution, wherein the biopolymer is present in an amount of 0.1-40 wt. %,
   (iv) adding, to the solution, 35-60 vol. % of one or more non-solvents, chosen from the group of acetone (dimethylketone), mono- or dialkyl ketones and alkoxy alkanol, under mixing, and
   (v) extracting the biopolymer from the solution,
   wherein weight c.q. volume percentages are relative to a total mass c.q. volume of the final solution.

2. The process according to claim 1, wherein the biopolymer is alginate or bacterial alginate (ALE), comprising the step of
   (i) extracting a mono-valent alginate or bacterial alginate (ALE) solution from extracellular polymeric substances obtainable from granular sludge.

3. The process according to claim 2, wherein the granular sludge is one or more of aerobic granular sludge and anammox granular sludge.

4. The process according to claim 2, wherein the extracellular polymeric substances are in aqueous solution at a concentration in the range of 0.1-30% w/w.

5. The process according to claim 2, wherein the extracellular polymeric substances comprise a major portion consisting of exopolysaccharides, and a minor portion consisting of lipids and/or other components more hydrophobic than the exopolysaccharides.

6. The process according to claim 2 wherein the extracellular polymeric substances comprise at least 50 w/w exopolysaccharides.

7. The process according to claim 2, wherein the granular sludge has been substantially produced by bacteria belonging to the order Pseudomonadaceae, and/or *Acetobacter* bacteria (aerobic granular sludge); or, by bacteria belonging to the order Planctomycetales (anammox granular sludge), or, combinations thereof.

8. The process according to claim 1, comprising the step of, directly before adding non-solvent,
   (iii) dissolving bioploymer under addition of 1-5 wt. % of a mono-valent salt of at least one of carbonate, hydroxide, hypochlorite, peroxide, and ammonia.

9. The process according to claim 1, wherein the amount of non-solvent is 40-55 vol. %.

10. The process according to claim 1, wherein extraction is performed by filtering.

11. The process according to claim 1, further comprising (vi) a work up step for retrieving non-solvent.

12. The process according to claim 1, further comprising (vii) a step of redispersing biopolymer by wetting with 0.1-10 wt. % acetone before redispersing.

13. The process according to claim 1, further comprising (viii) a step of sedimentation.

14. The process according to claim 2, wherein the alginate is ammonium-alginate, and/or wherein the non-solvent is selected from mono- or dialkyl ketones, and alkoxy alkanols, such as iso propoxy ethanol, and further comprising a step of
   (ix) heating the alginate to a temperature above 340 K, during a period of at least one minute to irreversibly transfer the alginate into alginate-amide thermoset resin under separation of water.

* * * * *